Patented June 2, 1936

2,042,588

UNITED STATES PATENT OFFICE 2,042,588

CELLULOSE STRUCTURE

William Hale Charch, Buffalo, N. Y., and William Frederick Underwood, Waynesboro, Va., assignors to Du Pont Cellophane Company, Inc., New York, N. Y., a corporation of Delaware No Drawing. Application August 3, 1932, Serial No. 627,362

8 Claims. (Cl. 91—68)

This invention relates to articles formed of pellicular regenerated cellulose, such as films, sheets, ribbons, bottle caps, tubes, sausage casings, etc., possessing properties hitherto not secured, and to the method of making the same.

Throughout the following specification, the term "regenerated cellulose" is used. It is to be understood that this expression "regenerated cellulose" is intended to embody that material in such forms as films, ribbons, bottle caps, tubes, sausage casings, etc. regardless of the methods of manufacture thereof.

Articles composed of pellicular regenerated cellulose, when perfectly free from moisture or any foreign materials which are considered conductors of electrical current, such as iron rust particles or electrolytes, exhibit good electric insulating properties. These regenerated cellulosic articles when perfectly bone dry, however, are quite brittle and cannot be flexed, stretched or crumpled to any great extent without rupture. It is often necessary in the fabrication of electrical condensers and other electrical apparatus in which an electric insulating medium composed of regenerated cellulose is employed to bring about the flexing after the moisture has been driven from it, as by the application of heat. This flexing usually results in a rupture of the regenerated cellulose. It is obvious then that regenerated cellulose substantially free from moisture is unsuitable for such electrical insulating purposes as require this flexing.

Dry regenerated cellulose readily absorbs moisture from the atmosphere. This increase in moisture content of the regenerated cellulose decreases its value as an electrical insulating medium. Subsequent loss of this absorbed moisture results in the regenerated cellulose regaining its former value as an electrical insulating medium. This property of regenerated cellulose is highly objectionable, since the efficiency of electrical apparatus containing such material as an electrical insulating medium would be variable.

In the fabrication of articles using regenerated cellulose sheets or films for dielectrics, etc., it has been necessary to strongly dry out or dehydrate the regenerated cellulose sheets or films, and this has resulted in embrittlement and given rise to other difficulties.

An increase in the moisture content of a regenerated cellulose film usually results in an increase in its dimensions. Subsequent loss of this moisture results in the film substantially regaining its former dimensions. These phenomena are also highly objectionable in many instances; for example, in envelopes or in cartons, windows made from regenerated cellulose wrinkle or buckle and often become unsightly because of this change in dimensions with moisture absorption.

Regenerated cellulose is usually softened by impregnation with some water-soluble hygroscopic material, such as glycerol, glycols, and the like. The softening action of these materials is generally attributed partly to the moisture which they absorb from the atmosphere and partly to the pure lubrication effect of such materials in the mass of the regenerated cellulose. Regenerated cellulose impregnated with such materials, if subjected to prolonged drying, as by the application of heat, ruptures on flexing only slightly less readily than regenerated cellulose free from said materials. These hygroscopic materials do not in general have a very high electrical insulating value and, due to their hygroscopic nature, are objectionable for regenerated cellulosic articles which are to be used for electrical insulating purposes. Furthermore, regenerated cellulose which is impregnated with hygroscopic materials, such as glycerols, glycols and the like, deforms somewhat more with moisture absorption, and in addition is subject to more marked variations in its electrical insulating properties than regenerated cellulose free therefrom.

Substantially dry and softener-free regenerated cellulose, when subjected to temperatures of 0° C. or below, becomes brittle and ruptures easily on flexing, and this becomes the more pronounced the lower the temperature. This behavior is highly objectionable in instances where such regenerated cellulose is employed at a temperature of 0° C. or less. For example, packages, lined packages, window cartons or the like, fabricated from regenerated cellulose, are used in the so-called quick-freezing processes for preserving fresh fruits, vegetables, etc., and are thus subjected to very low temperatures and often ruptured due to the flexing or mechanical handling when at these low temperatures. These temperatures may often reach −40° C. or even as low as −70° C. Incorporation of hygroscopic softening materials, such as glycerols, glycols and the like, into regenerated cellulose may improve the tendency to resist rupture on flexing when subjected to low temperatures, but the effect is not very marked in this direction. Incorporation of a material into regenerated cellulose which solidifies, or tends to solidify, at temperatures above the temperature at which the articles are subjected to flexing, tends to increase the susceptibility to rupturing of the articles when they are flexed.

We have found that by impregnating regenerated cellulose with an organic substance which is non-hygroscopic, insoluble in water, insoluble in water-soluble solvents, such as alcohol or acetone, and soluble in water-insoluble liquids, such as benzene, toluene, xylene and gasoline, such as petroleum derivatives, specifically vaseline, waxes and preferably mineral oils, we can overcome the above-mentioned disadvantages and produce a material which is admirably suited for use under high and/or low temperature conditions as an electrical insulator. Due to the lesser effect of humidity conditions on this impregnated regenerated cellulose, it may be capable of finding use under circumstances where a regenerated cellulose softened with a hygroscopic material would be undesirable or at a disadvantage because of its deforming properties.

It is, therefore, an object of this invention to produce regenerated cellulose which changes in properties and dimensions less with variations of the surrounding moisture or atmospheric conditions than softener-free regenerated cellulose or regenerated cellulose which is ordinarily impregnated with hygroscopic materials, such as glycerols, glycols and the like.

Another object of this invention is to produce regenerated cellulose which is resistant to rupture on flexing while substantially free from moisture or when heated to 100° C. or above.

Another object of this invention is to produce regenerated cellulose which is better suited for electrical insulating purposes than regenerated cellulose which is moisture-free or impregnated with hygroscopic materials, such as glycerols, glycols and the like.

Another object of this invention is to produce regenerated cellulose which exhibits superior electrical insulating properties and which changes in properties and dimensions less with variation of the surrounding moisture or atmospheric conditions than the regenerated cellulose which has heretofore been used, whether combined with the usual softening materials or not.

Another object of this invention is to produce regenerated cellulose which is more flexible than the original regenerated cellulose prepared without the incorporation of any softening agent whatever.

Another object of this invention is to produce regenerated cellulose which is more resistant to rupture on flexing when cooled to temperatures below 0° C. than the original regenerated cellulose, or that which has been impregnated with the usual hygroscopic materials, such as glycerols, glycols and the like.

A specific object of this invention is to produce regenerated cellulose impregnated with an organic substance which is insoluble in water, insoluble in water-soluble solvents, such as alcohol or acetone, and soluble in water-insoluble liquids, such as benzene, toluene, xylene and gasoline.

A still further object of this invention is to provide a method of preparing regenerated cellulose having any and/or all of the characteristics previously set forth.

As is apparent from the foregoing objects, the invention in one of its phases comprises regenerated cellulose uniformly impregnated with a non-hygroscopic organic substance which is insoluble in water, insoluble in water-soluble solvents, such as alcohol or acetone, and soluble in water-insoluble liquids, such as benzene, toluene, xylene and gasoline. This product is characterized by improved flexibility under ordinary atmospheric conditions when substantially free from moisture and/or when heated to an atmosphere between 100° C. and 150° C. for as much as several hours or more and/or when subjected to a temperature of 0° C. or lower. In addition, the product shows improved electrical insulating properties over a wide range of conditions. Further, the regenerated cellulose is characterized in that it has a lesser tendency to absorb moisture than regenerated cellulose which is moisture-free or impregnated with a hygroscopic substance.

The uniform impregnation of the regenerated cellulose is accomplished in the following manner:

(a) The water is first displaced from gel regenerated cellulose, i. e. the condition of the regenerated cellulose in the course of its manufacture after purification and washing and prior to drying, which is, or is not, under tension, by immersing it in or passing it through one or more baths of a liquid or liquid mixture which, while water-soluble, is also soluble in a practically water-insoluble liquid or liquid mixture which latter contains a solvent for the impregnant. Following this treatment, the cellulose is subjected to either of the two following treatments (b) or (c).

(b) According to this procedure, the film treated as set forth in (a) is passed through or immersed in a bath of a water-immiscible liquid, such as toluene, xylene, gasoline, etc., or mixtures of such liquids which contain in solution the substances with which it is desired to impregnate the regenerated cellulose. After remaining in this bath for any desired period the film is removed, the excess liquor preferably wiped away and the treated film dried, preferably under tension in both directions.

As a modification of the above, we may use, if desired, a water-immiscible liquid diluted partly with a water-miscible liquid. In a continuous process, dilution of this second bath with the water-miscible liquid from the first bath will naturally take place, but this does not interfere with the process as long as sufficient water-immiscible liquid is present to hold the impregnating substance in solution. Thus, we can allow or use a considerable dilution of the second bath with a water-miscible liquid, in some cases as much as 50% by volume, depending on the liquids employed. Our preferred form is to use a mixed bath for dissolving the impregnating substance, i. e. one containing preferably a certain portion of the water-miscible liquids from the first bath or similar water-miscible liquids, as, for example, a mixture of 25% ethyl alcohol and 75% toluol.

(c) As a further modification of (b), we can thoroughly remove all the water-miscible liquid from the film before immersing it in the impregnating bath which is made up of a water-immiscible liquid or liquid mixture. This may be done by washing the film from treatment (a) by means of any number of baths of a water-immiscible liquid and then immersing it finally in the impregnating bath which is made up of a water-immiscible liquid or liquid mixture. The intermediate washing baths may or may not contain or be composed of the same liquid as is used for the impregnating bath, or they may or may not necessarily be composed of or contain solvents for the impregnants.

As impregnants, the instant invention contemplates non-hygroscopic organic substances which are insoluble both in water and in water-soluble solvents, such as alcohol or acetone, and soluble in water-insoluble liquids, such as benzene, toluene, xylene and gasoline. Several illustrative examples of such substances are: paraffin oils, petroleum oils, paraffin waxes, mineral oils, ceresins, vaselines, Halowaxes (chlorinated naphthalenes), resin oils, transformer oils, tristearin, petrolatums, ozokerites and the like, or synthetic oils, greases, vegetable and animal waxes, or mixtures of these substances with materials which are soluble in water-miscible liquids or water-miscible liquid mixtures, but which are also soluble in the same liquid, liquids, or liquid mixtures as the substances, such as the oils, fats and waxes, which are practically insoluble in water-soluble liquids or liquid mixtures. In the preferred embodiment, petroleum derivatives having the solubility characteristics set forth, such as vaseline, wax and preferably mineral oil, are contemplated.

Examples of the liquids which may be used to displace the water from the regenerated cellulose are alcohols, such as methyl, ethyl, or propyl alcohol, esters such as ethyl acetate and ethyl lactate, ketones such as acetone, lower fatty acids such as acetic acid and the like, or any mixture of such liquids.

Examples of the solvents for the impregnating substance above mentioned which will uniformly impregnate them into the regenerated cellulose are benzine, benzol, toluol, xylol, carbon tetrachloride, cyclohexane, diethyl ether, dipropyl ether, di-isopropyl ether, tetrachlorethane, or a mixture of any of these or similar liquids, or a mixture of ethyl alcohol with toluol, benzol or xylol when the alcohol concentration does not exceed 50%.

The amount of impregnant incorporated in the regenerated cellulose may vary within wide limits. Depending on the impregnant, satisfactory results are obtained when the impregnant constitutes from 1% to 40% or more, such as 12% to 30%, and preferably 20% more or less, of the structure.

Although the preferred treatment as described was applied to gel regenerated cellulose, it is obvious that any regenerated cellulose may be used as the starting material which previous to being treated is swelled as, for example, by treatment with solutions of caustic, zinc chloride, calcium thiocyanate and equivalent substances, which are miscible with water-soluble liquids and are removed before treatment with the liquids described under Part (a) of the preferred procedure for treatment of the regenerated cellulose. It is also obvious that the treatment may be applied to regenerated cellulose of any source whatever, such as regenerated cellulose formed from viscose or cuprammonium solutions and in combination with the process of producing the same.

Regenerated cellulose impregnated with these non-hygroscopic substances having good electrical insulating properties, such as oils, fats, waxes, etc. previously mentioned, absorbs less moisture and consequently changes in dimensions less than the unimpregnated material. In some cases, the deformation with moisture absorption of regenerated cellulosic films and sheets between 90% and 5% relative humidity at 35° C. was decreased by as much as 40% to 50% of that of the original regenerated cellulosic article by this treatment. This improvement in deformation properties of the regenerated cellulose permits its use satisfactorily as windows in envelopes, cartons, and other containers where the deformation of the original regenerated cellulose prevented such use. Many of the substances which can be uniformly impregnated into regenerated cellulose by this process do not become rancid on aging or heating, and, in general, are more resistant to development of rancidity on heating or aging than materials which are soluble in water-soluble liquids of the type mentioned. The new, uniformly impregnated, regenerated cellulose resulting from this invention, especially when impregnated with mineral oils, transformer oils, vaselines, Halowaxes, and petrolatums, paraffin and the like, or mixtures of such substances, which are non-hygroscopic and have good electrical insulating properties, changes in properties and dimensions less with variation of the surrounding moisture or atmospheric conditions than the original regenerated cellulose. The regenerated cellulose, which is uniformly impregnated with mineral oils, vaselines, paraffins and the like, in some instances has better electrical insulating properties than the original regenerated cellulose or similar regenerated cellulose which has been impregnated with materials, such as oils, fats or waxes which are soluble in water-soluble solvents of the type mentioned. This uniformly impregnated regenerated cellulose also shows improved resistance to the passage of moisture, which increase in resistance to moisture transmission is dependent upon the substance with which it is impregnated. This uniformly impregnated regenerated cellulose also resists rupture better than the original regenerated cellulose if flexed when perfectly free from moisture or when subjected to prolonged periods of heating above 100° C. or when subjected to temperatures below 0° C. These properties of this treated regenerated cellulose make it very valuable for electrical insulating purposes and especially so where flexing of the material is required when substantially free from moisture. For example, this product may very satisfactorily be utilized in place of condenser papers, in the manufacture of condensers for telephonic or radio work, in the wrapping of electrical power wires, cables, etc., and for purposes where flexibility and toughness in a substantially moisture-free material are desired. It is obvious that the substance impregnated into the regenerated cellulose for electrical insulating purposes depends upon the particular electrical insulating application to which it is to be devoted. Another advantage of this process for producing electrical insulating materials is that regenerated cellulose uniformly impregnated with substances, such as mineral oils, paraffin, vaselines, etc., does not become rancid with heating or on aging and hence does not deteriorate in electrical insulating properties with aging or heating. These substances are relatively non-volatile and hence stay in the regenerated cellulose after impregnation. A further advantage of this process for producing electrical insulating materials is that substances, such as mineral oils, paraffin, vaselines, and the like, may be impregnated into regenerated cellulose, which substances have a minimum of corrosive action on metals such as are used in the construction of electrical apparatus. Regenerated cellulose impregnated with these substances may be used as a wrapping or covering for articles made from steel or iron to prevent tarnishing due to moisture, for which purpose the ordinary regenerated cellulose is relatively unsatisfactory. Regenerated cellulose uniformly impregnated with these substances, such as oils, fats, waxes, and particularly such substances which do not solidify above the temperature to which the treated regenerated cellulose may be cooled, resists rupture on flexing when cooled better than the original regenerated cellulose. Mineral oils are especially suitable for the uniform impregnation of regenerated cellulose which is to be subjected to flexing at very low temperatures.

In carrying out this invention, we have found it important to displace practically all of the water from the regenerated cellulose by liquids or liquid mixtures which are water-soluble in order to insure complete and even impregnation of the regenerated cellulose in the subsequent treatments.

We have also found it to be of advantage in carrying out this treatment of regenerated cellulose to maintain the material under tension during the treatment, facilitating thereby their uniform and complete impregnation. We have also found it to be an advantage to maintain the treated material under tension during final drying after the treatment in order to prevent undue wrinkling or curling during the drying process.

Although in general we prefer to carry out this impregnation treatment at room temperatures, higher temperatures or lower temperatures may be employed. For economy, however, in the use of solvents, low temperatures such as room temperature are more desirable. Too low temperatures, however, are objectionable since the viscosity of the treating solutions or liquids is thereby increased and uniform and complete impregnation of the regenerated cellulose is thereby rendered more difficult.

Hereafter are set forth several illustrative embodiments of the invention which have given satisfactory results:

*Example I.*—Sheets of regenerated cellulose after coagulation, regeneration, desulphuring, bleaching and washing free from acid with water, are immersed in several changes of ethyl alcohol to displace the water from the sheets. The dehydrated sheets are then placed in about one hundred times their own dry weight of a 5% solution of white paraffin oil in a mixture of 25% ethyl alcohol and 75% toluol for sufficient time to insure even and complete displacement of the alcohol from the sheets by the solution. Subsequently, the sheets while maintained under tension are dried at about 70° C.

The resultant sheets are transparent, soft and non-greasy on the surface. When the thus treated sheets are heated in an oven to 150° C. for a period of three hours or more and, upon being removed from the oven, are ruffled or flexed, no signs of shattering of the sheets are visible. Regenerated sheets treated in this manner change in properties and dimensions less with variation of the surrounding moisture or atmospheric conditions than similar untreated sheets. If sheets treated in this manner are cooled to —40° C. and then ruffled or flexed, no signs of rupture in the sheets are discerned. Regenerated cellulose sheets treated in this manner have very good electrical insulating properties which are stable with aging or on heating. These treated regenerated cellulose sheets do not develop any rancidity on aging or heating.

*Example II.*—Sheets of regenerated cellulose after coagulation, regeneration, desulphuring, bleaching and washing free from acid with water, are immersed in several changes of ethyl alcohol to displace the water from the sheets. The dehydrated sheets are then placed in about one hundred times their own dry weight of a 5% solution of solid paraffin wax in a mixture of 25% ethyl alcohol and 75% toluol for sufficient time to insure even and complete displacement of the alcohol on the sheets by the solution. The sheets while maintained under tension are dried at about 70° C.

The resultant sheets are transparent, soft and non-greasy on the surface. When the thus treated sheets are heated in an oven to 150° C. for three hours or more and, upon removal from the oven, ruffled or flexed, no signs of shattering of the sheets are apparent. Sheets of regenerated cellulose impregnated in this manner change in properties and dimensions less with variation of the surrounding moisture or atmospheric conditions than similar untreated sheets. These impregnated sheets have very good electrical insulating properties which are stable towards aging and heating. Moreover, these treated regenerated cellulose sheets do not develop any rancidity with aging or heating.

*Example III.*—Sheets of regenerated cellulose after coagulation, regeneration, desulphuring, bleaching and washing free from acid with water, are immersed in several changes of ethyl alcohol to displace the water from the sheets. The dehydrated sheets are then placed in about one hundred times their own dry weight of a 5% solution of white vaseline in a mixture of 25% ethyl alcohol and 75% toluol for sufficient time to insure even and complete displacement of the alcohol in the sheets by the solution. Subsequently, the sheets are dried at about 70° C. while under tension.

The resultant sheets are transparent, soft, and non-greasy on the surface. When the thus treated sheets are heated in an oven to 150° C. for a period of three hours or more and, after removal from the oven, ruffled or flexed, no signs of shattering of the sheets are apparent. Sheets of regenerated cellulose treated in this manner change in properties and dimensions less with variation of the surrounding moisture or atmospheric conditions than similar untreated sheets. When sheets treated in this manner are cooled to —40° C., and then ruffled or flexed, no signs of rupture in the sheets are visible. Regenerated cellulose sheets treated in this manner have very good electrical insulating properties which are stable with aging or on heating. These treated regenerated cellulosic sheets also do not develop any rancidity on aging or heating.

*Example IV.*—Sheets of regenerated cellulose after coagulation, regeneration, desulphuring, bleaching and washing free from acid with water, are immersed in several changes of ethyl alcohol to displace the water from the sheets. The dehydrated sheets are then placed in about one hundred times their own dry weight of a 5% solution of tristearin in a mixture of 25% ethyl alcohol and 75% toluol for sufficient time to insure even and complete displacement of the alcohol in the sheets by the solution. The sheets are then dried at about 70° C. while kept under tension.

The resultant sheets are transparent, soft and non-greasy on the surface. When the thus treated sheets are heated in an oven to 150° C. for a period of three hours or more and, upon removal from the oven, are ruffled or flexed, no signs of shattering of the sheets can be noted.

The sheets treated in this manner change less in properties and dimensions with variation of the surrounding moisture or atmospheric conditions than similar untreated sheets. When sheets treated in this manner are cooled to −40° C. and then ruffled or flexed, no signs of rupture in the sheets can be observed. Regenerated cellulose sheets treated in this manner have very good electrical insulating properties.

*Example V.*—Sheets of regenerated cellulose after coagulation, regeneration, desulphuring, bleaching and washing free from acid with water, are immersed in several changes of ethyl alcohol to displace the water from the sheets. The alcohol is then displaced from the regenerated cellulose sheets by immersion in several changes of toluol. The regenerated cellulose sheets containing the toluol are then immersed in about one hundred times their own dry weight of a 5% solution of white mineral oil in toluol for sufficient time to insure even and complete displacement of the toluol from the sheets by this solution. The sheets are then dried at about 70° C. while maintained under tension.

The resultant sheets are transparent, soft and non-greasy on the surface. When the thus treated sheets are heated in an oven to 150° C. for three hours or more and, upon removal from the oven, ruffled, there are no signs of shattering of the sheets. These impregnated sheets change in properties and dimensions less with variation of the surrounding moisture or atmospheric conditions than similar untreated sheets. When sheets impregnated in this manner are cooled to −40° C. and then ruffled or flexed, there are no signs of rupture of the sheets. These regenerated cellulose sheets impregnated in this manner have very good electrical insulating properties which are stable towards deterioration on heating or aging. These treated sheets do not develop rancidity on aging.

*Example VI.*—Sheets of regenerated cellulose after coagulation, regeneration, desulphuring, bleaching and washing free from acid with water, are immersed while under tension in several changes of ethyl alcohol to displace the water from the sheets. The dehydrated sheets, while under tension, are then immersed in several changes of toluol to displace the alcohol from the sheets. These regenerated cellulose sheets containing toluol, while under tension, are next immersed in about one hundred times their own dry weight of a 5% solution in toluol of white paraffin oil showing high electrical insulating properties for a sufficient time to insure even and complete displacement of the toluol from the sheets by this solution. The sheets under tension are dried at about 70° C.

The resultant sheets are transparent, soft and non-greasy on the surface. When the thus treated sheets are heated in an oven to 150° C. for a period of three hours or more and, upon their removal from the oven, ruffled or flexed, there are no signs of rupturing the sheets. These regenerated sheets impregnated in this manner change in properties and dimensions less with variation of the surrounding moisture or atmospheric conditions than similar unimpregnated sheets. When these regenerated cellulose sheets treated in this manner are cooled to −40° C. and then ruffled, there are no signs of rupturing the sheets. These impregnated sheets possess good electrical insulating properties which are stable toward heating or aging. These impregnated regenerated cellulose sheets do not develop any rancidity on aging.

Although all of the examples given are for the treatment of regenerated cellulose sheets, it is obvious that the same treatment is applicable to other regenerated cellulose articles, such as films, threads, filaments, bottle caps, ribbons, or tubes such as sausage casings, and that the properties of the products resulting will be the same as those of the treated sheets of regenerated cellulose.

It is to be understood that the invention is not restricted to the precise impregnants hereinbefore described. Other impregnants, such as asphalt, rubber, balata, gutta percha, gums and resins, possessing the solubility characteristics set forth in connection with the preferred impregnants, either alone or in combination with each other or the impregnants previously described, may also be used.

This invention, wherein the softening material is uniformly impregnated and combined with the cellulose structure, is to be sharply and clearly distinguished from other inventions wherein materials, such as pigments, emulsions of oils, fats and waxes, are added to the viscose and later coagulated with it. In the case of pigments or emulsions of liquids, the pigment particles or the particles of liquid, such as the oil used in the emulsion, exist and are present as discreet particles surrounded on all sides by cellulose. The oil is discontinuous with the cellulose in the same way that a pigment in the viscose is discontinuous with itself. In the impregnated structures constituting this invention, the oils, waxes, etc. do not exist as colloidal particles of microscopic size but are probably molecularly dispersed throughout the entire molecular mass of the cellulose and absorbed thereby. The impregnants are absorbed in the cellulose and are probably continuous with respect to themselves in the same way that the cellulose is continuous with respect to itself.

Since it is obvious that various changes may be made in the specific details hereinabove set forth, this invention is not restricted thereto except as set forth in the appended claims.

We claim:

1. A pellicular regenerated cellulose structure uniformly and completely impregnated only with one or more non-hygroscopic organic substances which are insoluble in water, insoluble in acetone or alcohol, and soluble in benzene, toluene, xylene or gasoline and which organic substance or substances are selected from the class consisting of mineral oils, fats, waxes and greases; the said non-hygroscopic organic substance being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

2. A pellicular regenerated cellulose structure uniformly and completely impregnated only with 1% to 40% by weight of one or more non-hygroscopic organic substances which are insoluble in water, insoluble in acetone or alcohol, and soluble in benzene, toluene, xylene or gasoline and which organic substance or substances are selected from the class consisting of mineral oils, fats, waxes and greases; the said non-hygroscopic organic substance being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

3. A pellicular regenerated cellulose structure uniformly and completely impregnated only with petrolatum, the petrolatum being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

4. A pellicular regenerated cellulose structure uniformly and completely impregnated only with 1% to 40% by weight of petrolatum, the petrolatum being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

5. A pellicular regenerated cellulose structure uniformly and completely impregnated only with a mineral oil which is insoluble in water, insoluble in acetone or alcohol, and soluble in benzene, toluene, xylene or gasoline, the mineral oil being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

6. A pellicular regenerated cellulose structure uniformly and completely impregnated only with 1% to 40% by weight of a mineral oil which is insoluble in water, insoluble in acetone or alcohol, and soluble in benzene, toluene, xylene or gasoline, the mineral oil being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

7. A pellicular regenerated cellulose structure uniformly and completely impregnated only with a wax which is insoluble in water, insoluble in acetone or alcohol, and soluble in benzene, toluene, xylene or gasoline, the wax being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

8. A pellicular regenerated cellulose structure uniformly and completely impregnated only with 1% to 40% by weight of a wax which is insoluble in water, insoluble in acetone or alcohol, and soluble in benzene, toluene, xylene or gasoline, the wax being so dispersed in the structure that the latter is transparent and exhibits superior electrical insulating properties and higher resistance to rupture even when cooled to 0° C., and changes in dimensions and properties less with variation of the surrounding moisture than regenerated cellulose impregnated with hygroscopic substances.

WILLIAM HALE CHARCH.
WILLIAM FREDERICK UNDERWOOD.